US007759902B2

(12) United States Patent
Gangsto et al.

(10) Patent No.: US 7,759,902 B2
(45) Date of Patent: Jul. 20, 2010

(54) SINGLE CHIP MICROCONTROLLER INCLUDING BATTERY MANAGEMENT AND PROTECTION

(75) Inventors: Gunnar Gangsto, Trondheim (NO); Arne Aas, Trondheim (NO); Runar Sorasen, Vikhammer (NO)

(73) Assignee: Atmel Corporation, San Jose, CA (US)

( * ) Notice: Subject to any disclaimer, the term of this patent is extended or adjusted under 35 U.S.C. 154(b) by 27 days.

(21) Appl. No.: 11/335,057

(22) Filed: Jan. 18, 2006

(65) Prior Publication Data

US 2006/0170398 A1    Aug. 3, 2006

(51) Int. Cl.
*H02J 7/00*    (2006.01)
(52) U.S. Cl. .................. 320/134; 320/132; 324/434
(58) Field of Classification Search ................ 320/132, 320/134, 136, 118, 122; 361/18; 307/10.7; 324/433, 434
See application file for complete search history.

(56) References Cited

U.S. PATENT DOCUMENTS

| | | | | |
|---|---|---|---|---|
| 4,553,081 A | * | 11/1985 | Koenck | 320/131 |
| 5,278,487 A | | 1/1994 | Koenck | 320/21 |
| 5,357,203 A | * | 10/1994 | Landau et al. | 324/427 |
| 5,408,235 A | | 4/1995 | Doyle et al. | 341/143 |
| 5,479,085 A | * | 12/1995 | Honda et al. | 320/134 |
| 5,619,430 A | * | 4/1997 | Nolan et al. | 702/63 |
| 5,909,188 A | | 6/1999 | Tetzlaff et al. | 341/155 |
| 5,955,869 A | * | 9/1999 | Rathmann | 320/132 |
| 6,081,216 A | | 6/2000 | May | 341/143 |
| 6,218,809 B1 | | 4/2001 | Downs et al. | 320/132 |
| 6,456,219 B1 | | 9/2002 | Schreiber et al. | 341/155 |
| 6,489,749 B1 | * | 12/2002 | Nakashimo et al. | 320/134 |
| 6,507,171 B2 | | 1/2003 | Ruha et al. | 320/128 |
| 6,580,250 B1 | * | 6/2003 | Stellberger et al. | 320/134 |
| 6,614,374 B1 | | 9/2003 | Gustavsson et al. | |
| 6,646,845 B1 | * | 11/2003 | Turner et al. | 361/86 |
| 6,898,534 B2 | | 5/2005 | Du | 702/64 |
| 7,113,122 B2 | | 9/2006 | Gangsto | |
| 7,292,174 B2 | | 11/2007 | Gangstoe | |

(Continued)

FOREIGN PATENT DOCUMENTS

WO    WO-2006078850 A3    7/2006

OTHER PUBLICATIONS

Davis, Jessica; email; RE: TI Improves Battery Gauge; Electronic News; available @ www.reed-electronics.com/electronicnews/index.asp?layout=articlePrint&articleID=CA452 . . . ; last accessed Jan. 17, 2005, 1 pg.

(Continued)

*Primary Examiner*—Edward Tso
*Assistant Examiner*—Ramy Ramadan
(74) *Attorney, Agent, or Firm*—Schwegman, Lundberg & Woessner, P.A.

(57) ABSTRACT

A microcontroller is disclosed. The microcontroller comprises a processor system and a high voltage interface coupled to the processor system and adapted to be coupled to a battery. The microcontroller further includes a battery management system for monitoring the battery and managing the battery based upon the monitoring of the battery. The microcontroller is a single chip. This one-chip solution saves design cost and PCB space in addition to broadening the functionality of the smart battery application. With the accuracy of the microcontroller, the charge status of the battery can be predicted more accurately and therefore effectively increases actual battery capacity.

21 Claims, 9 Drawing Sheets

U.S. PATENT DOCUMENTS

| | | | | |
|---|---|---|---|---|
| 2005/0062457 | A1 | 3/2005 | Galant et al. | 320/128 |
| 2005/0127879 | A1* | 6/2005 | Sato et al. | 320/134 |
| 2005/0197795 | A1 | 9/2005 | Aas et al. | 702/107 |
| 2005/0212489 | A1* | 9/2005 | Denning et al. | 320/134 |
| 2005/0242779 | A1* | 11/2005 | Yoshio | 320/134 |
| 2005/0269992 | A1* | 12/2005 | Lai et al. | 320/134 |
| 2006/0071643 | A1* | 4/2006 | Carrier et al. | 320/132 |

OTHER PUBLICATIONS

Barsukov, Yevgen et al.; email; RE: Fuel Gauge Technology Predicts Run Time in Multi-Cell Portable Applications, Texas Instruments; available @ www.ednasia.com/article.asp?id=108; last accessed Jan. 13, 2005; 5 pgs.

Gangsto, Gunnar et al., "Current Sensing Analog to Digital Converter and Method of Use," U.S. Appl. No. 11/043,669, filed Jan. 25, 2005, 50 pgs.

Barsukov, et al., "Fuel Gauge Technology Predicts Run Time in Multi-Cell Portable Applications", http://www.ednasia.com/print.asp?id=108, 5 pgs.

Davis, J., "TI Improves Battery Gauge", http://www.reed-electronics.com/electronicnews, (Sep. 13, 2004), 1 pg.

"International Application Serial No. PCT/US2006/001951, Search Report mailed Aug. 17, 2007".

* cited by examiner

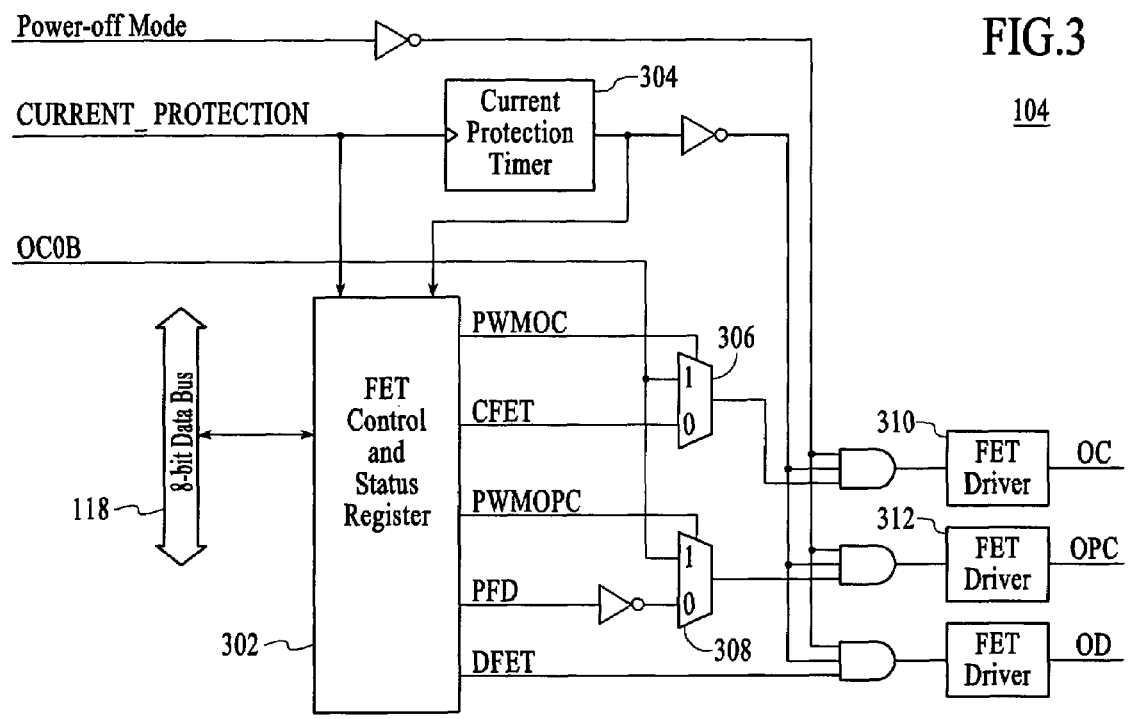

Note:
The shaded signals are scaled by 0.2, other signals are scaled by 1.0

US 7,759,902 B2

SINGLE CHIP MICROCONTROLLER INCLUDING BATTERY MANAGEMENT AND PROTECTION

FIELD OF THE INVENTION

The present invention relates generally to a microcontroller and more specifically to a single chip microcontroller which includes a battery management and protection system.

BACKGROUND OF THE INVENTION

The demand for portable applications such as laptop PCs, cell phones, and digital cameras is ever-increasing. These applications keep getting smaller and more advanced with tougher price competition every day. No application component can escape these toughening requirements, and the vital application power source, the battery, is certainly no exception. Battery capacity development is lagging behind the increasing demands from the application and control of the chemical reaction inside the battery is subject to severe safety requirements, making it difficult to push the limits of the chemical technology. To make life even more difficult for battery vendors, the battery is expected to shrink in size and price along with the rest of the application.

Advanced battery packs, or smart batteries, contain a large amount of electronic components. This includes fail-safe circuitry to ensure that the battery cell is not damaged or dangerous to the user; monitoring capabilities and logic to interpret battery conditions and estimate charge left depending on battery load; and communication with the host application. Current smart battery applications are implemented using at least two integrated circuits: a microcontroller for battery management and an analog front-end to ensure battery protection and measurements. In addition, some require a third chip, an EEPROM containing data specific to the battery chemistry, necessary for charge left estimation and other monitoring parameters. These solutions are costly and take up board space.

In addition, rechargeable battery cells typically have a low current capability. For applications where high instant energy is needed, this problem is overcome by using many cells in series. This results in a higher voltage allowing a higher energy with a lower current. The higher voltage is a problem for standard semiconductors as these typically can handle voltages between 2-5 volts. Smart battery vendors solve the high voltage input/output problem by using separate driver circuits. This adds to the cost, weight, and complexity of the system.

Accordingly, what is needed is a system and method for overcoming the above-identified issues. The present invention addresses such a need.

SUMMARY OF THE INVENTION

A microcontroller is disclosed. The microcontroller comprises a processor system and a high voltage interface coupled to the processor system and adapted to be coupled to a battery. The microcontroller further includes a battery management system for monitoring the battery and managing the battery based upon the monitoring of the battery. The microcontroller is a single chip. This one-chip solution saves design cost and PCB space in addition to broadening the functionality of the smart battery application. With the accuracy of the microcontroller, the charge status of the battery can be predicted more accurately and therefore effectively increases actual battery capacity.

BRIEF DESCRIPTION OF THE DRAWINGS

FIG. 3 is a block diagram of one embodiment of an FET control system in accordance with the present invention.

DETAILED DESCRIPTION

Figure 1:
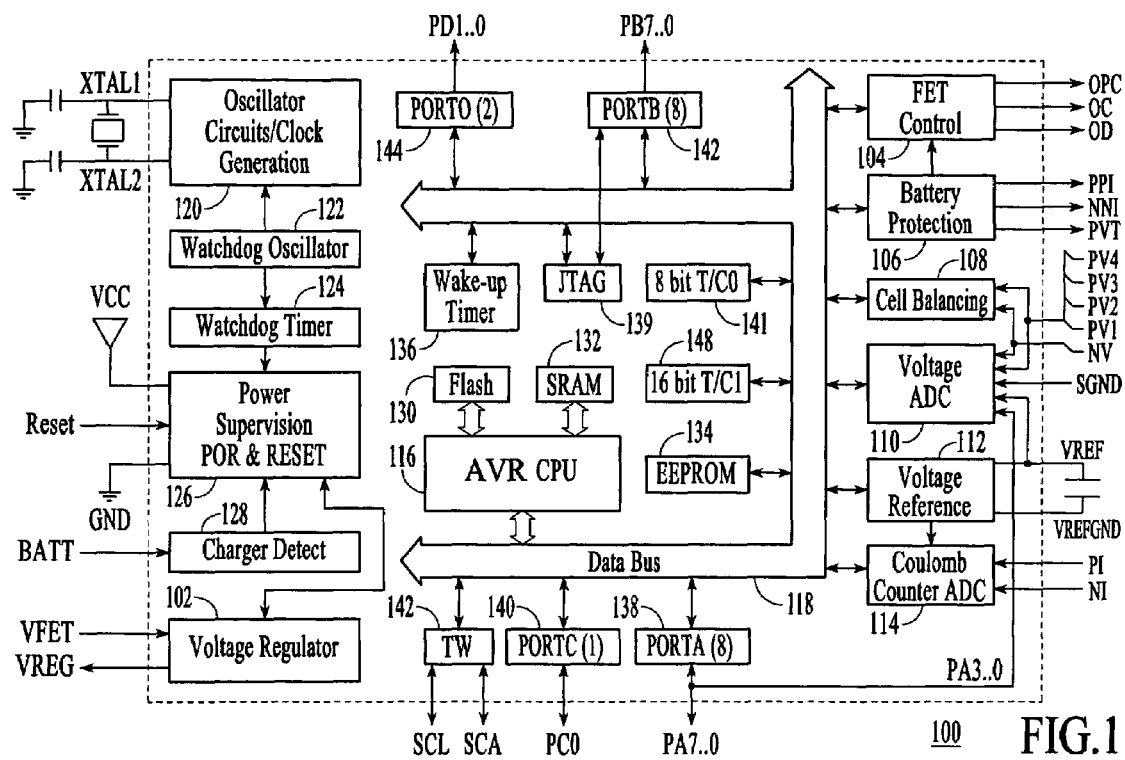
FIG. 1 is a block diagram of an embodiment of the microcontroller in accordance with the present invention.

The present invention relates generally to a microcontroller and more specifically to a single chip microcontroller which includes a battery management and protection system. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with the present invention provides for a single chip device which includes battery management and protection. In a single die, the microcontroller includes a central processing unit and a voltage regulator capable of being powered directly from a multiple cell battery. The microcontroller also includes analog to digital converters tailored for battery monitoring, high voltage charge and discharge FET drivers, cell balancing capabilities, and independent battery protection circuitry. This one-chip solution saves design cost and PCB space in addition to broadening the functionality of the smart battery application. With the accuracy of the microcontroller, the charge status of the battery can be predicted more accurately. The more that is known about the charge status of the battery, the more the battery cell can be allowed to be depleted before reaching the level where the cell itself starts to be damaged. Accordingly, the actual capacity of the battery is increased.

The microcontroller features a high voltage input/output, which greatly helps reduce the total part count in the system. The microcontroller also includes an internal voltage regulator. The regulator enables operation of the microcontroller within a predetermined voltage range (i.e., from 4 volts to 25 volts). The analog to digital converter input channels can measure battery cell voltages as high as 25 volts, eliminating an external high voltage analog front-end. The device also provides a plurality of internal FET drivers capable of computing 25V levels, so no external FET drivers are required.

The battery monitoring capabilities of the microcontroller are tailored to smart batteries. The battery monitoring capabilities include a voltage analog to digital converter that at 12 volts DC provides for ±−1 least significant (LSB) maximum error which provides good voltage measurements across the cells of the battery. A dedicated fuel gauging current sensing ADC provides continuous current monitoring at a high resolution (such as 18-bit resolution) and high accuracy. The high accuracy of the microcontroller battery monitoring is made possible by an on-chip voltage reference with ±–0.1% error after calibration. An example of this type of calibration is described, for example, in U.S. application Ser. No. 10/795,027, entitled "Method and Apparatus of Temperature Compensation for an Integrated Circuit Chip Using On-Chip Sensor and Computation Means," filed on Mar. 4, 2004 and incorporated by reference in its entirety herein. The voltage and current measurements make it possible to estimate the charge left in the battery very accurately, allowing an application to draw more energy from the battery. It is known that a cell of the battery can be damaged if it is depleted below a certain voltage level. However, if this level is reliably known, it is safe to allow depletion very close to this level without risking cell damage. If the battery's state-of-charge is reliably known, it is possible to push the safe limit further towards depletion. With less refined measurement equipment, a guardband must be inserted into the estimate to ensure that the user will be able to shut down reliably. This guardband represents energy that could be used if the estimate really were to be trusted. A microcontroller in accordance with the present invention supplies the required accuracy to make use of this energy.

To describe the features of the present invention in more detail, refer now to the following discussion in conjunction with the accompanying figures. The present invention will be described in the context of a particular microcontroller; however, one of ordinary skill in the art recognizes that the features of the present invention could be utilized in a variety of devices and that use would be within the spirit and scope of the present invention. A device that incorporates the features of the present invention is a Smart Battery AVR (ATmega 406), manufactured by Atmel. The ATmega 406 is described in an ATmega 406 Preliminary Complete Document dated June 2005, which is incorporated by reference in its entirety herein.

FIG. 1 is a block diagram of an embodiment of the microcontroller 100 in accordance with the present invention. The microcontroller 100 in one embodiment includes the following elements: a processor, data bus 118, in-system programmable Flash with read-while-write capabilities, an EEPROM 134, an SRAM 132, a plurality of general purpose working registers (not shown), a plurality of general purpose I/O lines (not shown), a plurality of high-voltage I/O lines (not shown), a JTAG interface 139 for on-chip debugging support and programming, two flexible timer/counters 147 and 148 with pulse width modulation and compare modes, a wake-up timer 136, an SM-bus compliant two wire interface module 142, internal and external interrupts, a programmable watchdog timer 124 with internal oscillator 122, and four software selectable power saving modes. The microcontroller 100 also includes oscillator circuits/clock generation 120, power supervision circuit 126, and a charger detect circuit 128. The data bus 118 is coupled to ports 138, 140, 144 and 142.

The microcontroller 100 further includes a voltage regulator 102, a FET control circuitry 104, dedicated battery protection circuitry 106, integrated cell balancing FETs 108, high-voltage analog front-end, and two ADCs 110 and 114 with on-chip voltage reference 112 for battery fuel gauging.

In one embodiment, the CPU 116 combines a rich instruction set with the plurality of general purpose working registers. All of the registers are directly connected to the arithmetic logic unit (ALU) (not shown), allowing two independent registers to be accessed in one single instruction executed in one clock cycle. The resulting architecture is more code efficient while achieving throughputs up to ten times faster than conventional CISC microcontrollers.

The idle mode stops the CPU 116 while allowing the other chip function to continue functioning. The power-down mode allows the voltage regulator 102, battery protection circuitry 106, watchdog timer 124, and wake-up timer 136 to operate, while disabling all other chip functions until the next interrupt or hardware reset. In power-save mode, the wake-up timer 136, battery protection circuitry 106 and the CC-ADC 114 continues to run.

The on-chip Flash memory 130 allows the program memory to be reprogrammed in-system, by a conventional non-volatile memory programmer or by an on-chip boot program running on the CPU 116. A boot program can use any interface to download the application program in the Flash memory. Software in the boot Flash 130 will continue to run while the application Flash section is updated, providing true read-while-write operation. By combining the CPU 116 with the Flash memory 130, ADCs 110 and 114, dedicated battery protection circuitry 106, cell balancing FETs 108, and a voltage regulator 102 on a monolithic chip, the microcontroller 100 provides a highly flexible and cost effective solution for battery applications.

The voltage regulator 102 operates over a wide range of voltages, for example, 4.0-25 volts. This voltage is regulated to a constant supply voltage of nominally, for example, 3.3 volts for the integrated logic and analog functions.

The battery protection circuitry 106 monitors the battery voltage and charge/discharge current to detect illegal conditions and protect the battery from these when required. The illegal conditions are deep under-voltage during discharging, short-circuit during discharging and over-current during charging and discharging.

The integrated cell-balancing FETs 108 allow cell balancing algorithms to be implemented in software.

To describe the features of the microcontroller 100 in more detail, refer now to the following description in conjunction with the accompanying figures.

High Voltage I/O

For battery monitoring and management devices several high voltage inputs and outputs are provided:
  Input to voltage regulator. This input provides power to the device drawn directly from the battery, in the range of 4-25 volts.
  Input to voltage ADC for individual cell voltage measurements.
  Input to detect the presence of a battery charger.
  High Voltage Open Drain Output (PCO).
  Outputs to charge, discharge, and pre-charge FETs.

The high voltage technology makes it possible to integrate Flash program memory and logic as well as accurate analog circuitry on the same die as high-voltage tolerant I/O. The microcontroller 100 is high voltage (25 volts) tolerant, making it appropriate for multiple cell batteries.

Voltage Regulator 102

Figure 2:
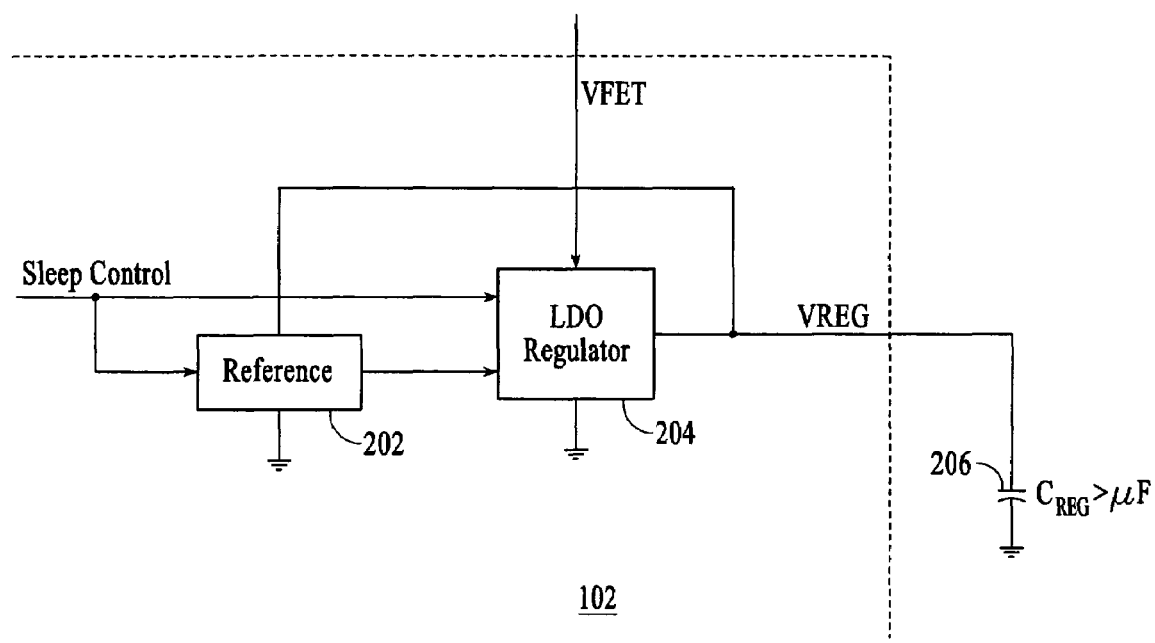
FIG. 2 is a block diagram of an embodiment of a voltage regulator in accordance with the present invention.

FIG. 2 is a block diagram of an embodiment of a voltage regulator 102 in accordance with the present invention. Modern semiconductors typically run at power supply in the range of 2 to 5 volts. A battery supplying up to 25 volts can thus not source the semiconductor directly. The microcontroller 100 is powered from the battery through the internal voltage regulator 102. The input to the regulator 102 is allowed to vary from 4 to 25 volts. This voltage is regulated down to 3.3 v internally, which is a suitable level for the internal logic, low voltage I/O lines, and analog circuitry.

To minimize power consumption during inactive periods, the voltage regulator optionally contains a power consumption control module 202. When the microcontroller 100 enters low power modes, the voltage regulator 102 will reduce the consumption in the regulator itself, further contributing to low power consumption. An external decoupling capacitor 206 of 1 μF or larger is provided for operation of the voltage regulator 102.

Battery Management

A smart battery will not only monitor battery parameters, it will also manage the environment of the battery according to these parameters. The microcontroller 100 provides battery charging algorithms, cell balancing, and communication with the host application to manage and protect the battery pack.

FET Control 104

Figure 3A:
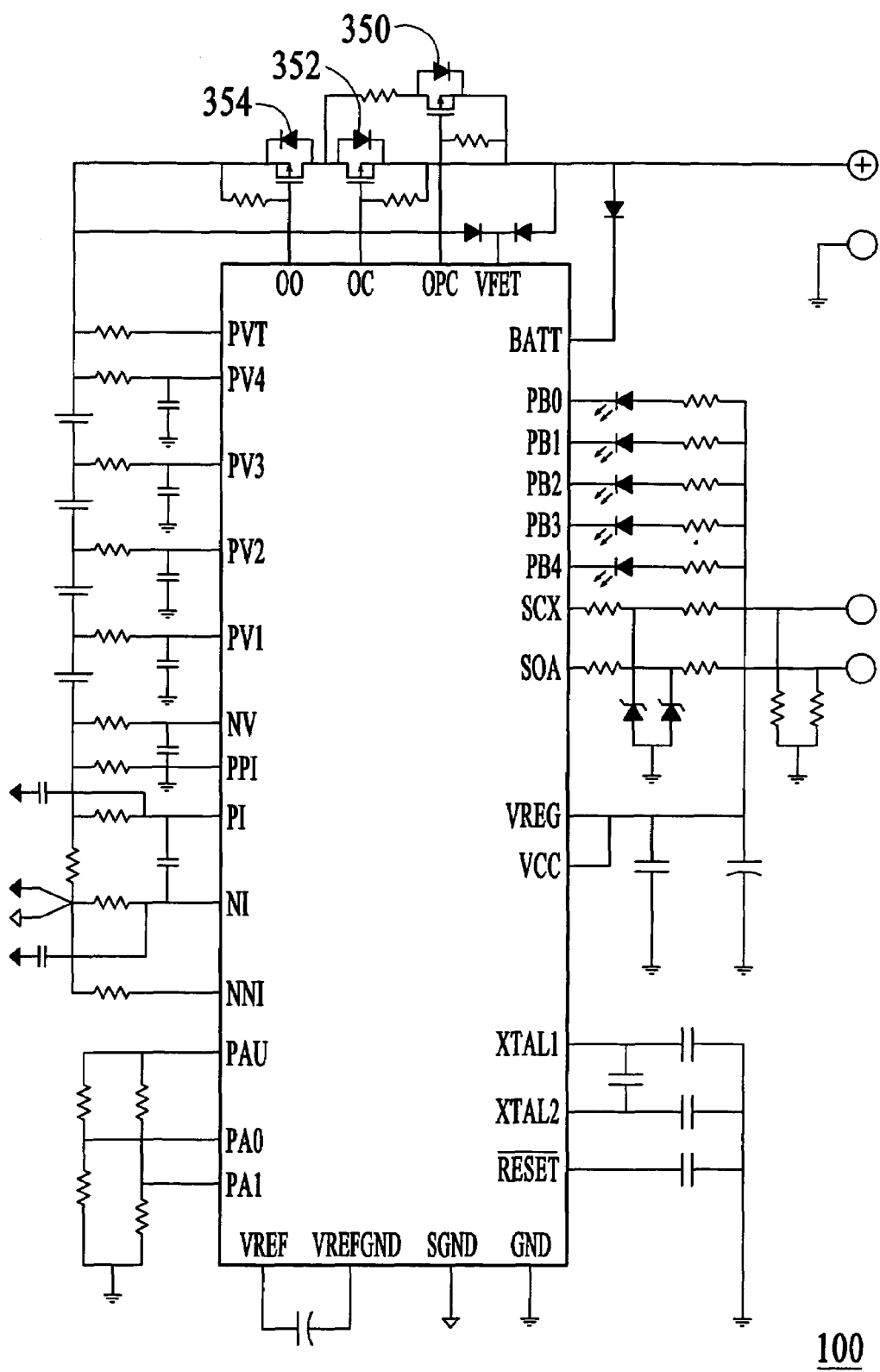
FIG. 3A is a schematic diagram of an operating circuit utilizing the FET control system in accordance with the present invention.

FIG. 3 is a block diagram of one embodiment of an FET control 104 in accordance with the present invention. FIG. 3A is a schematic diagram of an operating circuit utilizing FED control system in accordance with the present invention. Referring to FIGS. 1, 3 and 3A together, in addition to the FET disable control signals from the battery protection circuitry 106, the CPU may disable the Charge FET (C-FET) 352, the Discharge FET (D-FET) 354, or both, by writing to the FET control and status register 302. Note that the CPU 116 is never allowed to enable a FET that is disabled by the battery protection circuitry 106.

The pulse width modulator (PWM) output from the 8-bit timer/counter0, signal OC0B, can be configured to drive the C-FET 352 via FET driver 310, Precharge FET (PC-FET) driver 312 or both directly. This can be useful for controlling the charging of the battery cells. The PWM is configured by the 2:0 bits in the registers. Note that the OC0B pins do not need to be configured as an output. This means that the PWM output can be used to drive the C-FET 352 and/or the PC-FET 350 without occupying the OC0B-pin.

If C-FET 352 is disabled and D-FET 354 enabled, discharge current will run through the body-drain diode of the C-FE·T 352 and vice versa. To avoid the potential heat problem from this situation, software must ensure that D-FET 354 is not disabled when a charge current is flowing, and that C-FET 352 is not disabled when a discharge current is flowing.

If the battery has been deeply discharged, large surge currents may result when a charger is connected. In this case, it is recommended to first pre charge the battery through a current limiting resistor. For this purpose, the microcontroller 100 provides a Precharge FET 350 (PC-FET) control output. This output is default enabled.

If the microcontroller 100 has entered the power-off mode, all FET control outputs will be disabled. When a charger is connected, the CPU 116 will wake up. When waking up from power-off mode, the C-FET 352 and D-FET 354 control outputs will remain disabled while PC-FET 350 is default enabled. When the CPU 116 detects that the cell voltages have risen enough to allow normal charging, it should enable the C-FET 352 and D-FET 354 control outputs and disable the PC-FET 350 control output. If the current battery protection (CBP) which will be described in detail hereinafter, has been activated, the current protection timer will ensure a hold-off time of 1 second before software can re-enable the external FETs.

Cell Balancing 108

Figure 4:
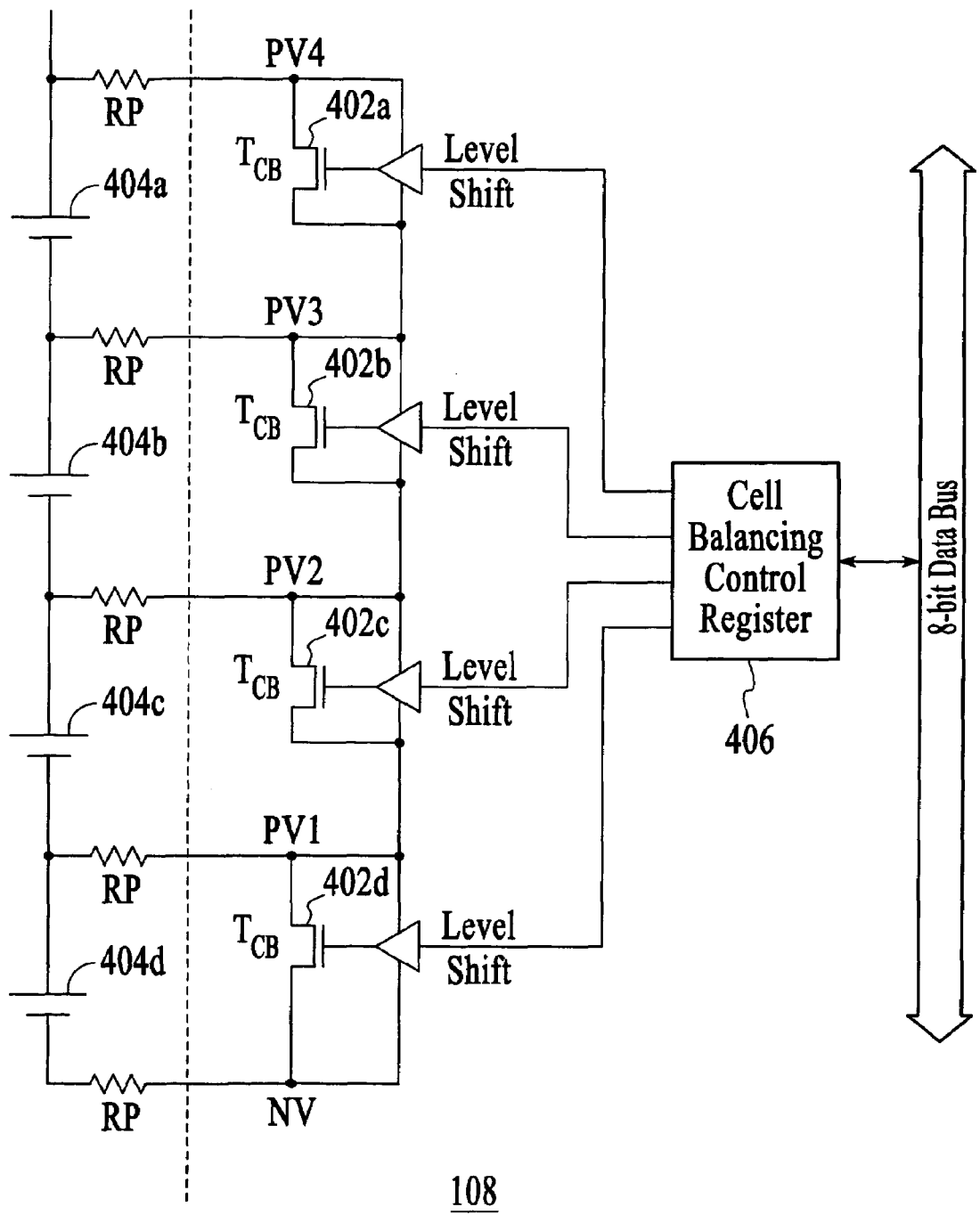
FIG. 4 is one embodiment of a diagram of a cell balancing FETs in accordance with the present invention.

FIG. 4 is one embodiment of a diagram of a cell balancing FETs 108 in accordance with the present invention. The microcontroller 100 incorporates cell-balancing FETs 402a-402d. The microcontroller 100 provides one cell balancing FET 402a-404d for each battery cell. The FETs 402a-402d are directly controlled by application software, allowing the cell balancing algorithms to be implemented in software. In one embodiment, the FETs 402a-404d are connected in parallel with the individual battery cells. The cell balancing FETs 402a-402d are disabled in the power-off mode.

Typical current through the cell balancing FETs 402a-402d ($T_{CB}$) is 2 mA. The cell balancing FETs 402a-402d are controlled by the cell balancing control register 406. In this embodiment, neighboring FETs cannot be simultaneously enabled. If trying to enable two neighboring FETs, both will be disabled.

SMBus™ 118

In the PC battery pack application, SMBus (System Management Bus) is the standard for communication with the PC. The microcontroller 100 features a two-wire serial interface compatible with the SMBus standard.

Simple but powerful and flexible communication interface, only two bus lines needed Both master and slave operation supported Device can operate as transmitter or receiver 7-bit address space allows up to 128 different slave addresses Multi-master arbitration support Operates on 4 MHz clock, achieving up to 100 kHz data transfer speed Slew-rate limited output drivers Noise suppression circuitry rejects spikes on bus lines Fully programmable slave address with general call support Address recognition causes wake-up when the CPU is in sleep mode The SMBUS interface can be used to upgrade the program code using the CPU's self-programming capabilities.

Battery Parameters

As before described, the microcontroller 100 includes an EEPROM 134 for data storage. It is organized as a separate data space, in which single bytes can be read and written. This data space is intended for storage of key parameters vital to the battery application.

Voltage Measurements

Individual cell voltages within the battery require differential ADC measurements. To adjust the level of the measured cell voltage to that of the ADC, an internal gain is provided. Single-ended channels are utilized to measure other parameters such as the regulated voltage, and temperature at various locations inside the battery pack.

Voltage ADC 110

Figure 5:
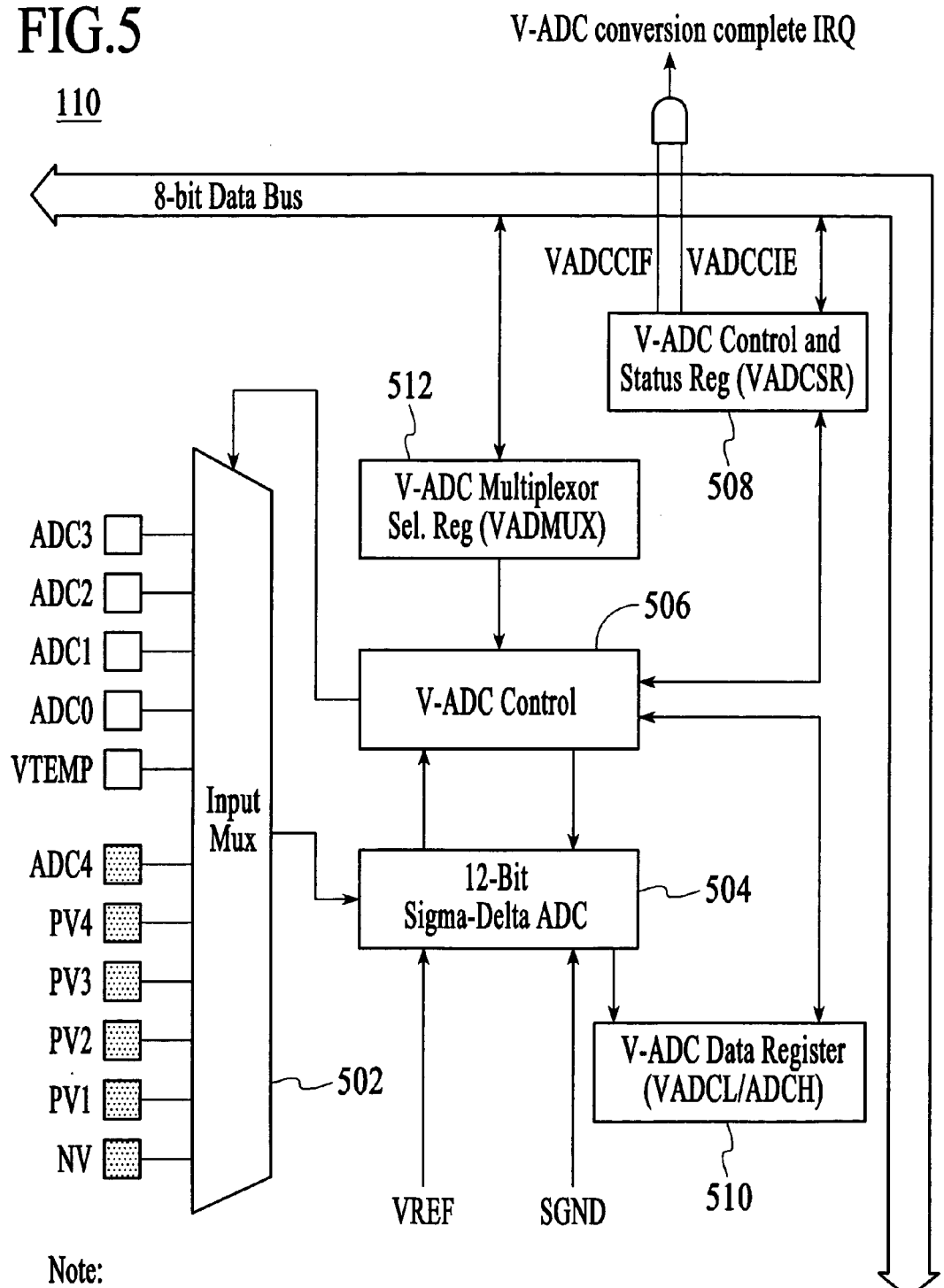
FIG. 5 is one embodiment of a voltage ADC in accordance with the present invention.

FIG. 5 is one embodiment of a voltage ADC 110 in accordance with the present invention. The V-ADC 110 of this embodiment comprises a plurality of differential channels, an input multiplexer 502 for receiving differential channels, a 12 bit sigma delta ADC 504, a V-ADC control system 506 for communicating with the input mux 502 and the sigma-delta ADC 504. V-ADC control and status register 508 receiving data from and providing data to the data bus 116. The V-ADC control and status register 508 also receives data from and provides data to the V-ADC control 506. The V-ADC 110 also includes a V-ADC data register 510 which receives data from the sigma-delta ADC 504 and provides data to the data bus 116. The four differential channels for cell voltage measurements (PV1–NV, PV2–PV1, PV3–PV2, PV4–PV3) are scaled to comply with the full scale range of the V-ADC. In addition, there are six single ended channels referenced to signal ground. One channel is for measuring the internal die temperature sensor (VTEMP), four channels are for measuring the pins at port A for cell temperature monitoring (ADC3-ADC0) and one channel (ADC4) is for measuring the internal regulated voltage VREG. The ADC-4 input is also scaled to comply with the full scale range of the V-ADC.

To obtain accurate cell voltage measurements, calibration registers for the individual cell voltage gain in the analog front-end are provided. A factory calibration value is stored in the register, and a V-ADC conversion of a cell voltage is scaled with the corresponding calibration value to correct for gain error in the analog front-end. Typically this calibration occurs via software.

Counting Electrons

A PC battery pack is under constant abuse; it is constantly being depleted and then recharged at several levels of load. The smart battery is expected to tell how long it will be able to sustain the current load before it is depleted at any given time. In order to provide this service to the end user, the battery needs to know exactly how much energy has been drained from the battery so that this amount can be deducted from the full charge capacity of the pack. Once the remaining battery capacity is determined, a charge left algorithm can estimate the time left on the existing load. Calibration at various voltage points on the charge curve is not accurate enough; the smart battery has to actively log and count current charged into and discharged from the battery.

As before mentioned, the microcontroller 100 also includes a dedicated Coulomb counting analog-to-digital converter (CC-ADC) 114 optimized for Coulomb counting to sample the charge or discharge current flowing through the external sense resistor. This type of ADC is described in copending U.S. patent application Ser. No. 11/043,669 [3446P], entitled "Current Sensing Analog to Digital Converter and Method of Use," and assigned to the assignee of the present application.

Figure 6:
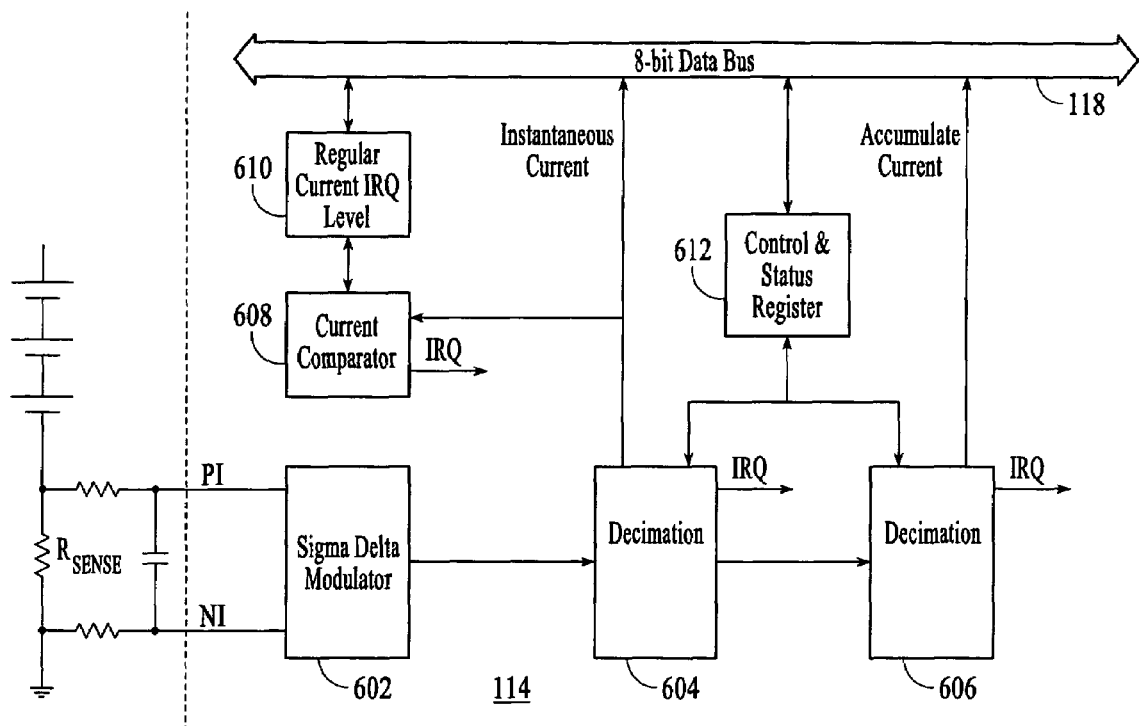
FIG. 6 is a block diagram of an embodiment of a CC-ADC.

FIG. 6 is a block diagram of an embodiment of a CC-ADC 114. The CC-ADC 114 includes a sigma-delta modulator 602, decimation filters 604 and 606, a current comparator 608, a regular current IRQ level 610, a control and status register 612 and an 8-bit data bus 118. The sigma-delta modulator 602 provides data to a decimation filter 604. Decimation filter 604 provides data to decimation filter 606, the current comparator 608 and the 8-bit databus 118. The regular current IRQ level 610 receives data from the 8-bit databus 118 and provides data to the 8-bit databus 118 and the current comparator 608. A control and status register 612 receives data from the 8-bit databus 118, and provides data to decimation filters 604 and 606. Decimation filter 606 receives data from the control and status register 612 and from decimation filter 604, and provides data to the 8-bit databus 118. Two different output values are provided: instantaneous current and accumulate current. The instantaneous current output has a short conversion time at the cost of lower resolution. The accumulate current output provides a highly accurate current measurement for Coulomb counting.

The accumulate current output is a high-resolution, high accuracy output with programmable conversion time. The converted value is an accurate measurement of the average current flow during one conversion period. The CC-ADC 114 generates an interrupt each time a new accumulate current conversion has finished if the interrupt is enabled.

While the CC-ADC 114 is converting, the CPU 116 can enter sleep mode and wait for an interrupt from the accumulate current conversion. After adding the new accumulate current value for Coulomb Counting, the CPU 116 can go back to sleep again. This reduces the CPU workload, and allows more time spent in low power modes, reducing power consumption.

The CC-ADC 114 can generate an interrupt if the result of an instantaneous current conversion is greater than a programmable threshold. This allows the detection of a regular current condition. This allows an ultra-low power operation, where the CC-ADC 114 can be configured to enter a regular current detection mode with a programmable current sampling interval. The CC-ADC 114 will repeatedly perform one instantaneous current conversion, before it is turned off for a timing interval specified by the user software. This allows operating the regular current detection while keeping the CC-ADC 114 off most of the time.

Internal Voltage Reference 112

Figure 7:
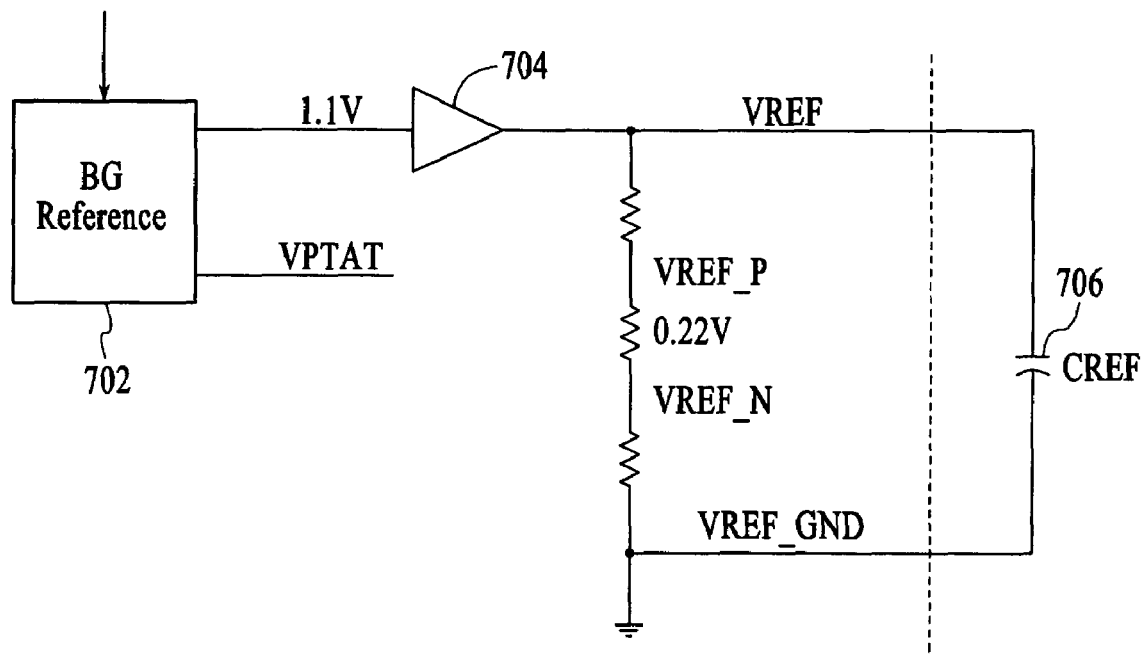
FIG. 7 illustrates an embodiment of a low power band-gap voltage reference in accordance with the present invention.

FIG. 7 illustrates an embodiment of a low power band-gap voltage reference 112 in accordance with the present invention. The low power band-gap voltage reference 112 provides the microcontroller with an accurate on-chip reference voltage ($V_{REF}$) of 1.100V. This $V_{REF}$ is used as reference for the on-chip voltage regulator 102, the V-ADC 110 and the CC-ADC 114 (FIG. 1). In a preferred embodiment, the reference to the two ADCs 110 and 114 uses a buffer 704 with external decoupling capacitor 706 to enable excellent noise performance with minimum power consumption. The reference voltage $V_{REF\_P}/V_{REF\_N}$ to the CC-ADC 114 is scaled to match the full scale requirements at the current sense input pins. This configuration also enables concurrent operation of both V-ADC 110 and CC-ADC 114.

To provide low temperature drift after factory calibration, the microcontroller 100 includes a two-step calibration algorithm. This algorithm is described, for example, in the before-mentioned U.S. application Ser. No. 10/795,027. The first predetermined temperature such as 85° and the second step is performed at a second predetermined temperature such as room temperature. By default, the factory calibration is 85°, and the result is stored in the Flash memory. The second calibration step can be implemented by a user as an instruction in their test flow. The step requires an accurate input voltage and a stable room temperature. The calibration register can also be altered runtime to implement temperature compensation in software. Accuracy for any temperature inside the temperature range can be achieved.

Also, in another embodiment the microcontroller 100 includes an on-chip temperature sensor (not shown) for monitoring the die temperature. A voltage proportional-to-absolute temperature, $V_{PTAT}$, is generated in the voltage reference circuit and connected to the multiplexer at the V-ADC input. The temperature sensor can be used for runtime compensation of temperature drift in both the voltage reference and the on-chip oscillator 120.

Battery Protection CPU Interface

Figure 8:
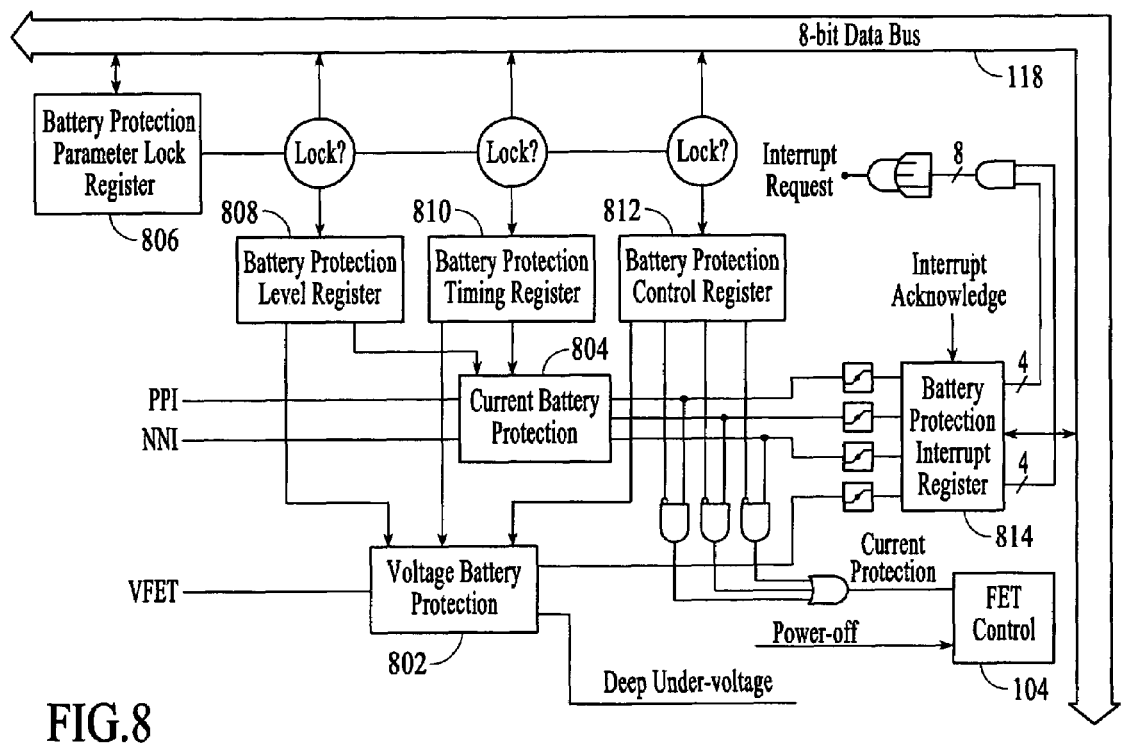
FIG. 8 illustrates an embodiment of the battery protection CPU interface in accordance with the present invention.

FIG. 8 illustrates an embodiment of the battery protection CPU interface in accordance with the present invention. The battery protection CPU interface comprises current battery protection circuitry (CBPC) 804 and voltage battery protection circuitry (VBPC) 802, and a plurality of battery protection parameter lockable registers 806, 808, 810, 812 and 814. The interface is coupled to the FET control 104 and the 8-bit data bus 118.

Each protection has an interrupt flag. Each flag can be read and cleared by the CPU 116, and each flag has an individual interrupt enable. All enabled flags are combined into a single battery protection interrupt request to the CPU 116. This interrupt can wake up the CPU 116 from any operation mode, except power-off. The interrupt flags are cleared by writing a logic '1' to their bit locations from the CPU 116.

There are neither flags nor status bits indicating that the microcontroller 100 has entered the power off mode. This is because the CPU 116 is powered down in this mode. The CPU 116 will, however, be able to detect that it came from a power-off situation by monitoring CPU 116 reset flags when it resumes operation.

The over-current and short-circuit protection parameters are reprogrammable to adapt to different types of batteries. The parameters are set by writing to I/O registers. The parameter registers can be locked after the initial configuration, prohibiting any further updates until the next hardware reset.

Secure Parameter Storage

In a preferred embodiment, the battery protection parameters set in the battery protection parameter registers and the disable function set in the battery protection disable register can be locked from any further software updates. Once locked, these registers cannot be accessed until the next hardware reset. This provides a safe method for protecting these registers from unintentional modification by software runaway. It is recommended that software sets these registers shortly after reset, and then protects these registers from any further updates.

The current battery protection circuitry (CBPC) 804 monitors the charge and discharge current and disables C-FET, PC-FET, and D-FET if an over-current or short-circuit condition is detected. There are three different programmable detection levels: discharge over-current detection level, charge over-current detection level and short-circuit detection level. The external filter at the PI/NI input pins will cause too large delay for short-circuit detection. Therefore the separate PPI/NNI inputs are used for current battery protection. There are two different programmable delays for activating current battery protection: short-circuit reaction time and over-current reaction time. After current battery protection has been activated, the application software must re-enable the FETs. In one embodiment, the battery protection circuitry 106 provides a hold-off time of, for example, one second before software can re-enable the discharge FET. This provides safety in case the application software should unintentionally re-enable the discharge FET too early.

The activation of a protection also issues an interrupt to the CPU 116. The battery protection interrupts can be individually enabled and disabled by the CPU 116.

The effect of the various battery protection types in this embodiment is provided in Table 1.

protection is disabled when both the C-FET and the PC-FET are disabled. Note however that charge over-current protection is never automatically disabled when any of the C-FET or PC-FETs are controlled by PWM.

Each of these types of battery protections and their features are described in detail hereinbelow.

Deep Under-Voltage Protection

The deep under-voltage protection ensures that the battery cells will not be discharged deeper than the programmable deep under-voltage detection level. If the voltage at the VFET pin is below this level for a time longer than the programmable delay time, the FETs are automatically switched off and the microcontroller enters power-off mode. A deep under-voltage early warning interrupt flag (DUVIF) within the battery protection interrupt register will be set 250 ms before the microcontroller enters power-off. This will give the CPU 116 a chance to take necessary actions before the power is switched off.

The microcontroller 100 will remain in the power-off mode until a charger is connected. When a charger is detected, a normal power-up sequence is started and the microcontroller 100 initializes to default state.

The deep under-voltage delay time and deep under-voltage detection level are set in the battery protection deep under-voltage register (BPDUV) which is part of the battery protection level register. The parameter registers can be locked after the initial configuration, prohibiting any further updates until the next hardware reset.

Discharge Over-Current Protection

The current battery protection current monitors the cell current by sampling the voltage at the PPI/NNI input pins. A differential operational amplifier amplifies the voltage with a suitable gain. The output from the operational amplifier is compared to an accurate, programmable on-chip voltage reference by an analog comparator. If the shunt resistor voltage is above the discharge over-current detection level for a time longer than over-current protection reaction time, the microcontroller 100 activates discharge over-current protection. A sampled system clocked by an internal ULP oscillator is used for over-current and short-circuit protection. This ensures a reliable clock source, off-set cancellation and low power consumption.

When the discharge over-current protection is activated, the external D-FET, PC-FET, and C-FET are disabled and a current protection timer is started. This timer ensures that the FETs are disabled for a predetermined period of time (i.e.,

TABLE 1

Effect of Battery Protection Types

| Battery Protection Type | Interrupt Requests | C-FET | D-FET | PC-FET | Cell Balancing FETs | MCU |
|---|---|---|---|---|---|---|
| Deep under-voltage detected | CPU Reset on exit | Disabled | Disabled | Disabled | Disabled | Power-off |
| Discharge over-current protection | Entry and exit | Disabled | Disabled | Disabled | Operational | Operational |
| Charge over-current protection | Entry and exit | Disabled | Disabled | Disabled | Operational | Operational |
| Short-circuit protection | Entry and exit | Disabled | Disabled | Disabled | Operational | Operational |

In order to reduce power consumption, both short-circuit and discharge over-current protection are automatically deactivated when the D-FET is disabled. The charge over-current one second). The application software must then set the DFE and CFE bits in the FET control and status register to re-enable normal operation when this is considered safe. If the D-FET is re-enabled while the loading of the battery still is too large, the discharge over-current protection will be activated again.

Charge Over-Current Protection

If the voltage at the PPI/NNI pins is above a charge over-current detection level for a time longer than over-current protection reaction time, the microcontroller 100 activates charge over-current protection.

When the charge over-current protection is activated, the external D-FET, PC-FET, and C-FET are disabled and a current protection timer is started. This timer ensures that the FETs are disabled for at least one second. The DFE and CFE bits in the FET control and status register 302 (FIG. 3) are set to re-enable normal operation when this is considered safe. If the C-FET is re-enabled and the charger continues to supply too high of a current, the charge over-current protection will be activated again.

Short-Circuit Protection

A second level of high current detection is provided to enable a faster response time to very large discharge currents. If a discharge current larger than the short-circuit detection level is present for a period longer than short-circuit reaction time, the short-circuit protection is activated.

When the short-circuit protection is activated, the D-FET, PC-FET, and C-FET are disabled and a current protection timer is started. This timer ensures that the D-FET, PC-FET, and C-FET are disabled for at least one second. The application software must then set the DFE and CFE bits in the FET control and status register 302 (FIG. 3) to re-enable normal operation when this is considered safe. If the D-FET is re-enabled before the cause of the short-circuit condition is removed, the short-circuit protection will be activated again.

Power Consumption

To avoid damaging the battery cells during long-term storage, it is important for the battery itself to consume as little power as possible. The single chip implementation helps reduce system power consumption by eliminating external components and collecting all functionality in one single package. In addition, the microcontroller 100 features various low-power modes called sleep modes. Sleep modes enable the application to shut down unused modules in the microcontroller 100, thereby saving power. The microcontroller 100 provides four sleep modes allowing the user to tailor the power consumption to the application's requirement:

1. Idle mode, in which the CPU 116 is stopped but all peripheral functions continue operating.

2. ADC noise reduction mode, which improves the noise environment for the ADC while saving power. If the V-ADC 110 (FIG. 1) is enabled, a conversion starts automatically once this mode is entered.

3. Power-save mode, in which a fast RC oscillator is stopped. Only the battery protection circuitry 106 and slow oscillators are kept running, as well as the CC-ADC 114 (FIG. 1) for current measurements.

4. Power-down mode, in which both the fast RC and slow RC clocks are halted. Battery protection, a watchdog timer 124 (FIG. 1) or external interrupt, or an SMBUS address match can wake up the device.

5. Power-off mode enables the voltage regulator 102 (FIG. 1) to shut off power to the CPU 116, leaving only the voltage regulator 102 and the charger detect circuitry 128 to be operational. In this mode the microcontroller 100 ensures that the battery cells are not damaged if the voltage is too low.

| Condition | Current Draw |
| --- | --- |
| Active 1 MHz | 1.2 mA |
| Idle 1 MHz | 0.6 mA |
| Power-save | 90 μA |
| Power-down | 20 μA |
| Power-off | 2 μA |

A system and method in accordance with the present invention provides for a microcontroller which includes battery management and protection. The microcontroller provides for a single chip device which includes battery protection and management. This one-chip solution saves design cost and PCB space in addition to broadening the functionality of the smart battery application. With the accuracy of the microcontroller, the charge status of the battery can be predicted more accurately and therefore effectively increases actual battery capacity.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A microcontroller comprising:
a processor system including a data bus;
a system management bus (SMBus) interface;
a high voltage battery interface coupled to the processor system, wherein a battery to be coupled to the high voltage battery interface comprises a plurality of cells, wherein the high voltage battery interface includes a plurality of inputs to the microcontroller capable of operating in a range of 4 volts to 25 volts; and
a battery management system to monitor the battery and to manage the battery based upon monitoring of the battery,
wherein the battery management system includes a control system to control charging and discharging of the battery,
wherein the control system includes a plurality of cell-balancing FETs coupled to the plurality of cells and to the data bus,
wherein there is one cell-balancing FET among the plurality of cell-balancing FETs coupled to each cell of the plurality of cells, and
wherein each cell balancing FET of the plurality of cell-balancing FETs is directly controlled by reprogrammable application software via a control register coupled to the data bus; and
wherein the microcontroller is a single chip.

2. The microcontroller of claim 1, wherein the battery management system includes a battery protection circuit to detect at least one illegal condition on the battery and to protect the battery from the at least one illegal condition.

3. The microcontroller of claim 2, wherein the at least one illegal condition comprises at least one of: a deep under-voltage during discharging, a short circuit during discharging, and an over-current during charging or discharging.

4. The microcontroller of claim 1, wherein the processor system further comprises:
a central processing unit (CPU).

5. The microcontroller of claim 1, wherein the battery management system further comprises:
a voltage regulator adapted to be coupled to the battery via the high voltage battery interface, wherein the voltage regulator is to regulate a supply voltage to the microcontroller at a predetermined level.

6. The microcontroller of claim 5, wherein an input to the voltage regulator is between substantially 4 volts and substantially 25 volts DC, and wherein the predetermined level is substantially 3.3 volts.

7. The microcontroller of claim 1, wherein the battery management system further comprises:
a first analog to digital converter (ADC) to provide an instantaneous current output value and an accumulate current output value.

8. The microcontroller of claim 7, wherein if the instantaneous current output value is greater than a programmable threshold current, then the first ADC generates an interrupt to the microcontroller to allow for low power operation.

9. The microcontroller of claim 7, wherein the battery management system further comprises:
a second analog to digital converter (ADC) to measure a cell voltage, wherein the first ADC and the second ADC are to provide continuous voltage and current monitoring of each cell of the plurality of cells.

10. The microcontroller of claim 9, wherein the battery management system includes an on-chip voltage reference coupled to the first ADC and the second ADC to provide an accurate reference voltage to the first ADC and the second ADC.

11. The microcontroller of claim 2, wherein the battery protection circuit further comprises a first circuit portion to protect the battery from an overcurrent condition or a short circuit condition by monitoring a charge current and a discharge current from the battery.

12. The microcontroller of claim 11, wherein the battery protection circuitry further comprises a second circuit portion to protect the battery from discharge deeper than a programmable deep undervoltage protection level.

13. A microcontroller comprising:
a processor system including a data bus;
a high voltage battery interface coupled to the processor system, wherein a battery to be coupled to the battery interface comprises a plurality of cells, wherein the high voltage battery interface includes a plurality of inputs to the microcontroller capable of operating in a range of 4 volts to 25 volts; and
a battery management system to monitor the battery and to manage the battery based upon monitoring of the battery, wherein the battery management system comprises:
a battery protection circuit to detect at least one illegal condition on the battery and to protect the battery from the at least one illegal condition;
a first analog to digital converter (ADC) to provide an instantaneous current output value and an accumulate current output value, wherein if the instantaneous current output value is greater than a programmable threshold current, then the first ADC generates an interrupt to the microcontroller to allow for low power operation;
a second analog to digital converter (ADC) to measure a cell voltage, wherein the first ADC and the second ADC are to provide continuous voltage and current monitoring of each cell of the plurality of cells;
an on-chip voltage reference coupled to the first ADC and second the ADC to provide an accurate reference voltage to the first ADC and the second ADC; and
a control system to control charging and discharging of the battery,
wherein the control system includes a plurality of cell-balancing FETs coupled to the plurality of cells and to the data bus, wherein there is one cell-balancing FET coupled to each of the plurality of cells, and wherein each cell balancing FET of the plurality of cell-balancing FETs is directly controlled by reprogrammable application software via a control register coupled to the data bus; and
wherein the microcontroller is a single chip.

14. The microcontroller of claim 13, wherein the at least one illegal condition comprises at least one of: a deep undervoltage during discharging, a short circuit during discharging, and an over-current during charging or discharging.

15. The microcontroller of claim 13, wherein the processor system further comprises:
a central processing unit (CPU).

16. The microcontroller of claim 13, wherein the battery management system further comprises:
a voltage regulator adapted to be coupled to the battery via the high voltage battery interface, wherein the voltage regulator is to regulate a supply voltage to the microcontroller at a predetermined level.

17. The microcontroller of claim 16, wherein an input to the voltage regulator is between substantially 4 volts and substantially 25 volts DC, and wherein the predetermined level is substantially 3.3 volts.

18. The microcontroller of claim 13, wherein the battery management system includes an on-chip voltage reference coupled to the first ADC and the second ADC to provide an accurate reference voltage to the first ADC and the second ADC.

19. The microcontroller of claim 13, wherein the battery protection circuit further comprises a first circuit portion to protect the battery from an overcurrent condition or a short circuit condition by monitoring a charge current and a discharge current from the battery.

20. The microcontroller of claim 19, wherein the battery protection circuitry further comprises a second circuit portion to protect the battery from discharge deeper than a programmable deep undervoltage protection level.

21. The microcontroller of claim 13, wherein the high voltage battery interface includes a high voltage input to at least one of the first ADC and the second ADC, wherein the high voltage input is configured to operate up to substantially 25 volts.

* * * * *

UNITED STATES PATENT AND TRADEMARK OFFICE
CERTIFICATE OF CORRECTION

PATENT NO. : 7,759,902 B2
APPLICATION NO. : 11/335057
DATED : July 20, 2010
INVENTOR(S) : Gunnar Gangsto et al.

It is certified that error appears in the above-identified patent and that said Letters Patent is hereby corrected as shown below:

In column 12, lines 1–2, above "Table" insert -- Table 2 shows key power consumption figures for one embodiment of the microcontroller 100. --.

Signed and Sealed this

Twenty-eighth Day of September, 2010

David J. Kappos
*Director of the United States Patent and Trademark Office*